(No Model.) 2 Sheets—Sheet 2.
H. LILLEY.
MACHINE FOR MAKING RINGS OR BANDS
No. 561,233. Patented June 2, 1896.

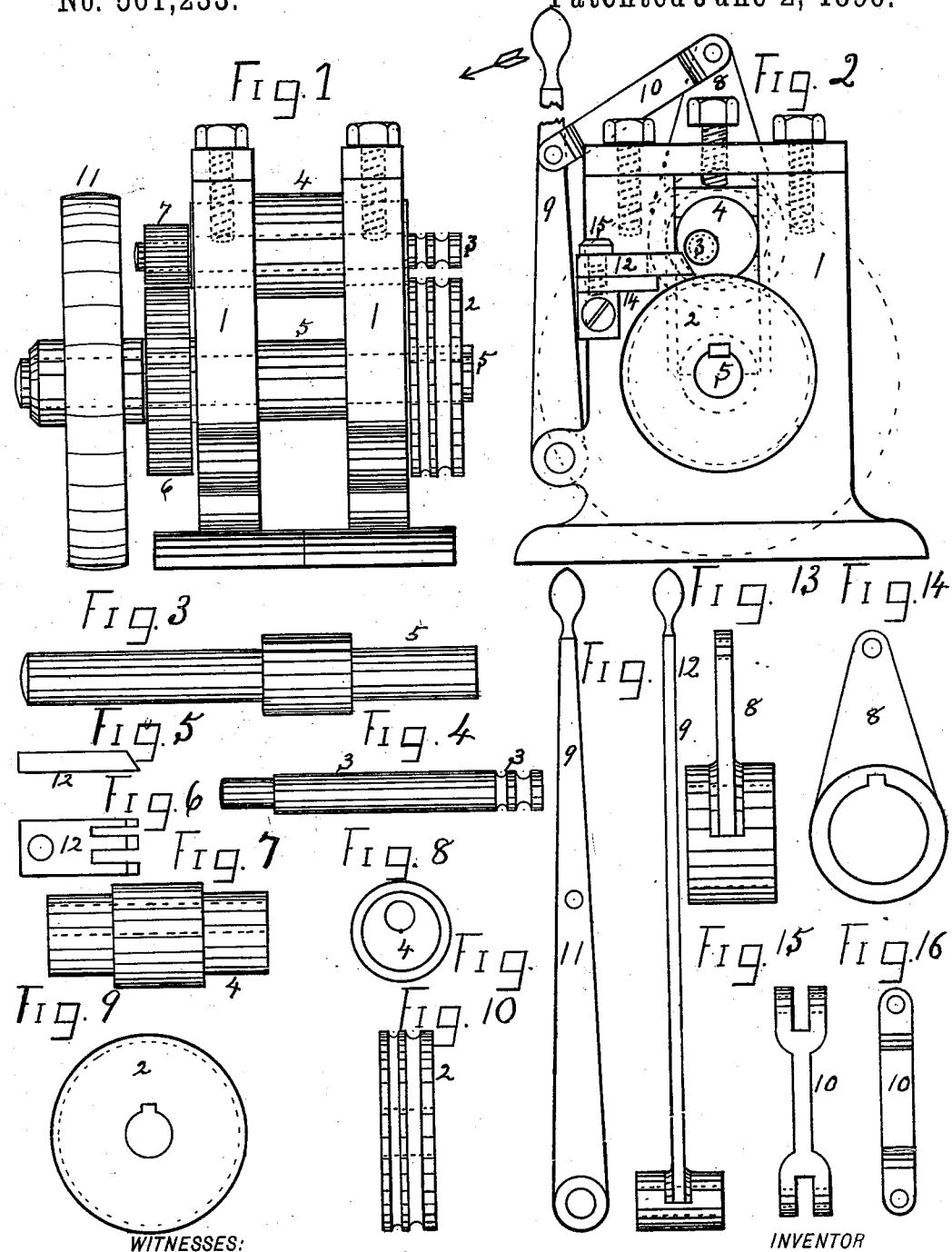

WITNESSES:
N. Marcus Shinn
A. Heffelfinger

INVENTOR
Henry Lilley
BY
John Shinn
ATTORNEY.

UNITED STATES PATENT OFFICE.

HENRY LILLEY, OF PHILADELPHIA, PENNSYLVANIA, ASSIGNOR TO THE WROUGHT IRON SPECIALTY COMPANY, OF ROYERSFORD, PENNSYLVANIA.

MACHINE FOR MAKING RINGS OR BANDS.

SPECIFICATION forming part of Letters Patent No. 561,233, dated June 2, 1896.

Application filed September 21, 1895. Serial No. 563,208. (No model.)

*To all whom it may concern:*

Be it known that I, HENRY LILLEY, a citizen of the United States, residing at Philadelphia, in the county of Philadelphia and State of Pennsylvania, have invented a new and useful Improvement in Machines for Making Rings or Bands; and I do hereby declare that the following is a full, clear, and exact description thereof, reference being had to the accompanying drawings, which form a part of this specification.

My invention relates to that class of metal-rolling machines designed for rolling rings and bands without weld or joint.

My invention is fully illustrated in the accompanying drawings, in which—

Figure 17:
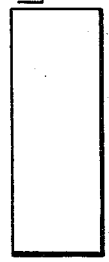
Figure 21:
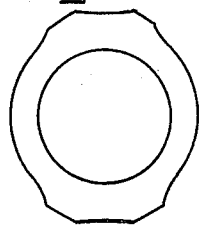
Figure 22:
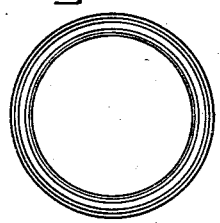
Figure 23:
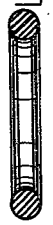
Figure 24:
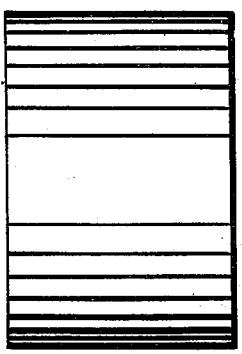
Figure 25:
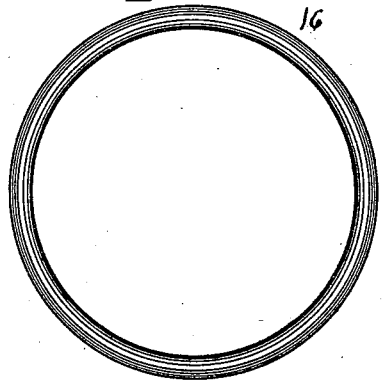
Figure 26:
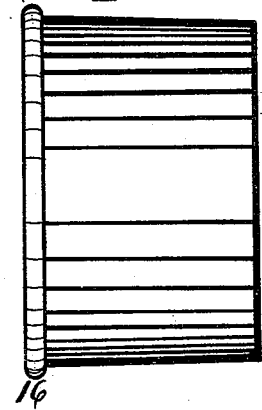

Figure 1 is a front view of the machine, (the operating-lever and connections not shown.) Fig. 2 is a side view of the machine. Figs. 3 to and including Fig. 16 are parts shown in detail. Figs. 17 to and including Fig. 21 show the steps in the process of preparing the metal blanks from which the rings are rolled. Fig. 22 shows the finished ring as rolled. Fig. 23 shows a half-ring in section. Figs. 24, 25, and 26 show the band.

Similar numerals of reference in the several figures refer to same parts in all views.

The construction of my improved machine for rolling rings and bands is as follows:

1 1 are the "housings" or frame, in which are mounted the shafts or rolls. These housings are usually made of cast-iron and extra heavy for strength.

5 is the bottom roll or driving-shaft. On the right-hand end is fixed the roller-die 2; on the left hand the driving-pulley 11 and sprue-wheel 6.

3 is the top roller-die. On the right-hand end of this roller are turned two half-round grooves. These grooves register with similar grooves in the bottom die 2. On the left hand is keyed a pinion-wheel 7. The roller 3 is mounted in an eccentric sleeve-bearing 4. (See Figs. 7 and 8.)

The shaft 5 and sleeve-bearing 4 are mounted in the housings 1 1, as shown in Figs. 1 and 2.

12 is a guide-plate mounted on the bracket 14. (See Fig. 2.) This guide-plate is made adjustable by a fastening-screw 15. On the eccentric sleeve 4 is mounted and keyed fast the arm 8. This arm 8 is connected by the bar 10 to the hand-lever 9.

Figure 18:
Figure 19:
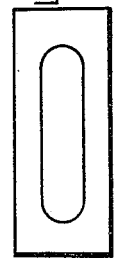
Figure 20:
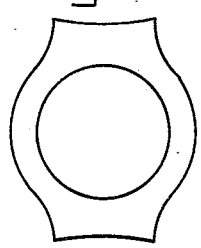

Previous to rolling the rings and bands the material or blanks are prepared and finished, as illustrated in Figs. 17 to and including Fig. 26. They are prepared as follows: The bar, Figs. 17 and 18, has a slot cut in it. (See Fig. 19.) This slot is opened out on a former to the shape shown in Fig. 20. The corners are then cut off, as shown in Fig. 21.

The bands, Figs. 24, 25, and 26, are made from metal tubing, such as scraps, short pieces of steam, water, and gas pipes, or new tubing may be used. The pipe or tubing is first cut into lengths, as shown in Fig. 24.

The operation of making rings is as follows: The blanks, as shown in Fig. 21, are heated to a proper working heat and placed hot on the roller 3, resting on the die 2 and in one of the grooves of the guide 12. The hand-lever 9 is moved in direction of the arrow, Fig. 2. This oscillates the eccentric sleeve 4 and puts the pinion 7 into gear with the wheel 6 and causes the die 3 to revolve, working in the metal from the front of Fig. 1 and from the left hand of Fig. 2. The metal, being soft from heat, will be rolled into the shape as shown in Figs. 22 and 23. The hand-lever 9 is now reversed. This throws the pinion 7 out of gear from the wheel 6, the ring is removed from the roller 3, and a hot one placed and worked as before described.

To roll bands, the die-roller 3 with grooves is removed and a roller put in having no grooves. The die 2 is also removed and one put on having only one groove. The band (shown in Fig. 24) is heated to a proper working heat and while hot placed on the roller-die 3, resting on the bottom die and in a wide groove of the guide 12.

The hand-lever 9, operated same as for making the rings, will gear the pinion 7 into wheel 6, and the pressure of the two rollers or dies will force the metal into the groove of the bottom die and form a bead 16 on one end of the band and roll it slightly taper, as shown in Fig. 26.

The rings and bands, after rolling, are heated red-hot and put on a former, that makes them a true circle. When cold, they are placed in a "rattler," which cleans them of scales. They are then ready for painting, lacquering, polishing, or plating.

The rings may be used for window-shutters, awnings, and other purposes where a metal ring is required.

The bands may be used on wagon-wheel hubs and other places where a metal band is wanted.

The rings and bands may be made in such size as desired—from one inch to twenty-four inches in diameter and larger, if desired, and of iron, steel, brass, copper, or other metal.

Having, as above, fully described the construction and operation of my improved ring and band rolling machine, what I claim as new, and desire to secure by Letters Patent, is—

In a machine for rolling metal rings, and bands; a bottom die-roller, in combination with a top roller, mounted in an eccentric sleeve-bearing, each roller having suitable gearing, so that while the top roller, may be free to revolve in the sleeve-bearing, it also may receive an oscillating motion, to bring the two rollers together, and put the top roller into and out of gear with the bottom roller, as shown and described.

HENRY LILLEY.

Witnesses:
  JOHN SHINN,
  MARCUS SHINN.